United States Patent [19]

Grube

[11] Patent Number: 4,812,094
[45] Date of Patent: Mar. 14, 1989

[54] LOCKING FASTENER ASSEMBLY FOR THREADED JOINT

[75] Inventor: William L. Grube, Lake Bluff, Ill.

[73] Assignee: MacLean-Fogg Company, Mundelein, Ill.

[21] Appl. No.: 100,746

[22] Filed: Sep. 24, 1987

[51] Int. Cl.⁴ ............................................. F16B 39/02
[52] U.S. Cl. ..................... 411/134; 411/198; 411/927; 411/533; 411/963; 301/111; 301/124 R; 403/384
[58] Field of Search ................. 411/197–199, 411/193–194, 202, 132–135, 114–115, 927, 953, 963, 533; 403/259, 384, 162, 320; 301/111, 126, 124 R

[56] References Cited

U.S. PATENT DOCUMENTS

| | | | |
|---|---|---|---|
| 613,776 | 11/1898 | Plain | 411/197 |
| 712,905 | 11/1902 | Cannon | 411/197 X |
| 1,040,215 | 10/1912 | Kriner | 411/197 |
| 1,081,631 | 12/1913 | Siever | 411/198 |
| 1,140,974 | 5/1915 | Formby | 411/115 |
| 1,150,362 | 8/1915 | Hascall | 411/198 |
| 1,543,282 | 6/1925 | De Loe | 411/197 |
| 1,611,408 | 12/1926 | Bowers | 411/198 |
| 3,208,493 | 9/1965 | Holmes | 411/193 X |
| 3,307,893 | 3/1967 | Williams | 403/320 X |
| 3,851,690 | 12/1974 | Wing et al. | 411/190 |
| 3,942,570 | 3/1976 | Bochman, Jr. et al. | 411/948 X |
| 4,210,372 | 7/1980 | McGee et al. | 403/320 X |

FOREIGN PATENT DOCUMENTS 26739 12/1904 United Kingdom ................ 411/275

Primary Examiner—Gary L. Smith
Assistant Examiner—Curtis B. Brueske
Attorney, Agent, or Firm—Mason, Kolehmainen, Rathburn & Wyss

[57] ABSTRACT

A locking fastener assembly for axle bearings and the like is free spinning during tightening and removal and is positively held against rotation after installation. The assembly is engageable with an axially slotted male threaded member and includes a nut with female threads and a flange end. A retainer washer includes spaced fingers formed around the nut flange for rotatably supporting the washer at the flanged end of the nut. The washer includes a tab received in the slot of the male threaded member permitting the nut to move axially but not to rotate on the male threaded member. When the nut is engaged by a wrench, the wrench releases a flexible and resilient locking clip to permit the nut freely to rotate. After the assembly has been threaded onto the male threaded member, removal of the wrench frees the locking clip and a lock finger is received in a space between fingers of the retainer washer positively to prevent further rotation of the nut.

14 Claims, 2 Drawing Sheets

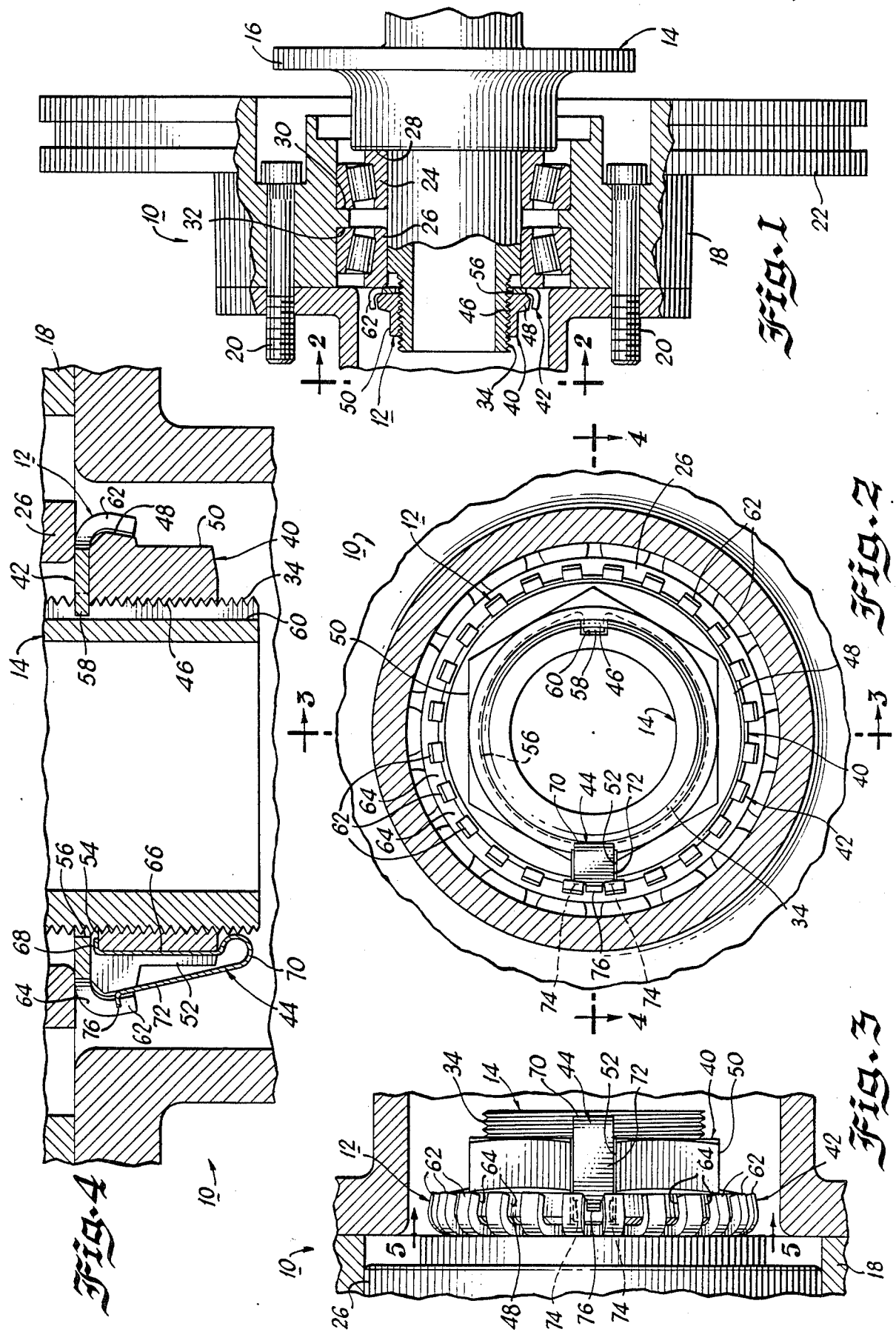

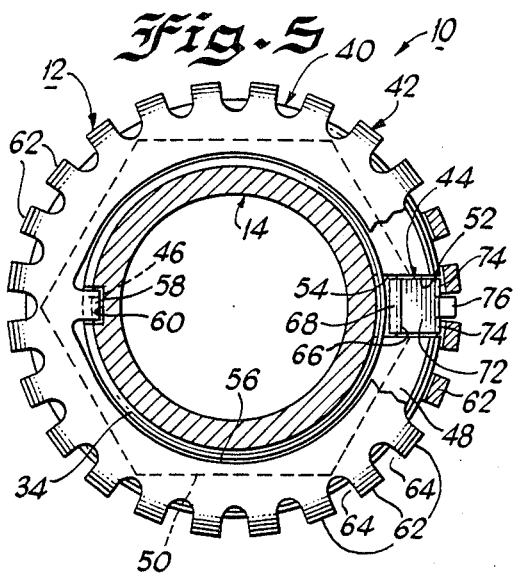
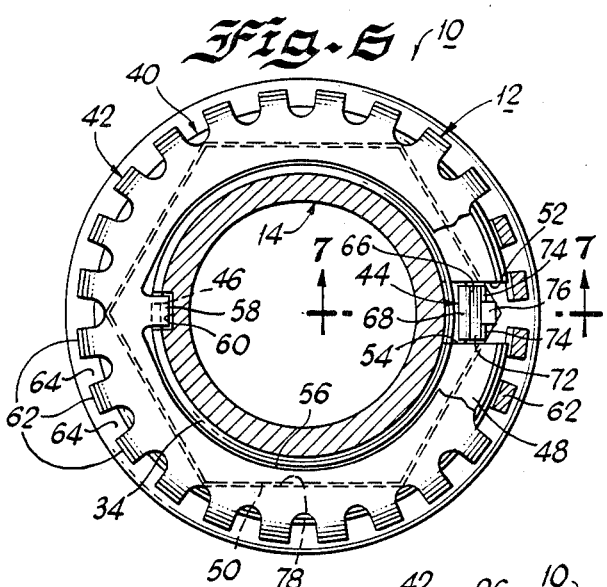
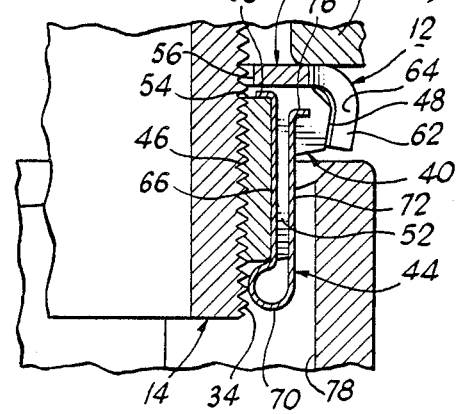
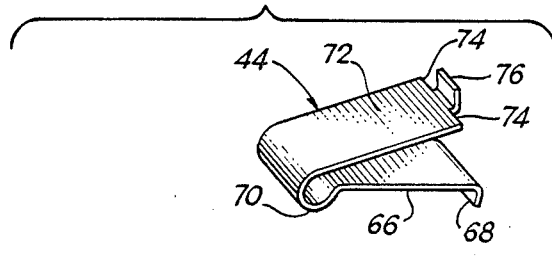
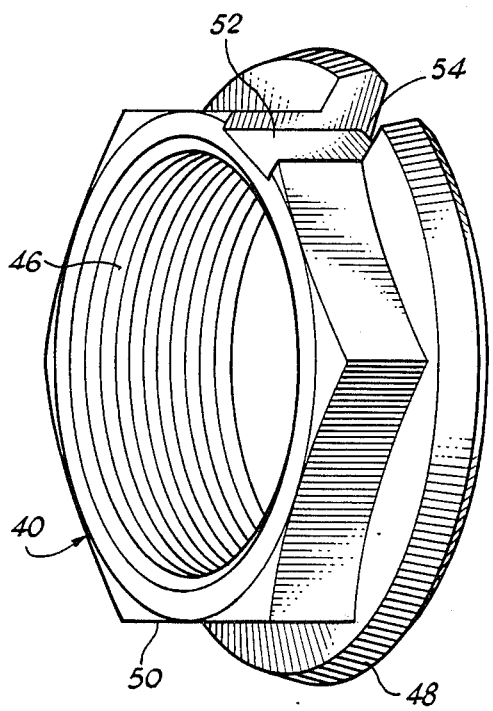
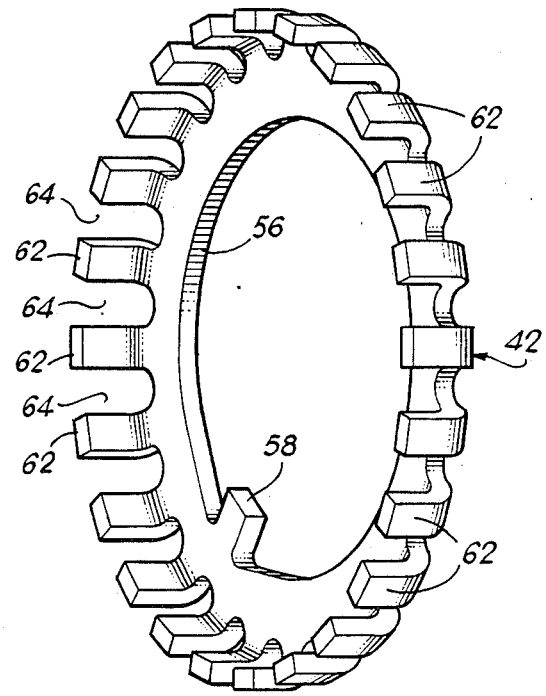

LOCKING FASTENER ASSEMBLY FOR THREADED JOINT

The present invention relates to locking fastener assemblies for threaded joints and more particularly to improvements in free-spinning locking fastener assemblies that are positively locked after installation.

BACKGROUND OF THE INVENTION

Locking fasteners and locking fastener assemblies are used to prevent loosening of a threaded fastener in a fastener joint. There are many types of threaded joints in which loosening of a fastener is undesirable. One example to which the principles of the present invention may be applied is an axle assembly of an automotive vehicle.

In a typical axle assembly, axle bearings are supported between an axle or spindle and a wheel hub or spindle support to permit rotation of a vehicle wheel. An axle bearing nut is used to hold the components together. In order to prevent premature bearing failure, the nut must be installed properly to avoid excessive axial bearing load or, alternatively, excessive free play. In addition, after assembly it is important to prevent loosening of the axle bearing nut to avoid bearing failure or even dangerous loss of a wheel.

A conventional axle assembly includes a spindle with male threads having an axially extending slot. A washer received on the spindle has a tab in the slot to prevent rotation of the washer. After the nut is threaded onto the spindle and tightened to the desired degree, part of the washer is deformed to lock the washer to the nut and prevent further rotation of the nut.

This conventional approach has disadvantages. One serious problem, especially in original mass production, is that installation of the washer and nut requires too many manual assembly steps. Another disadvantage is that the washer must be deformed both after installation of the nut and again when it is desired to remove the nut. The fact that the nut and washer are separate pieces makes it possible for the assembly to be installed improperly, for example without the washer or with an incorrect or damaged washer. Moreover, the locking of the nut against rotation is not as positive as desired because the washer can be deformed or broken.

In order to overcome such disadvantages of the conventional assembly, it has been proposed to provide locking fastener assemblies in which a washer and a nut are normally locked against rotation and in which the installation tool or wrench can be manipulated to free the nut for rotation. Examples of such proposals can be found in U.S. Pat. Nos. 3,851,690 and 3,942,570. While the assemblies disclosed in these patents overcome some disadvantages of the conventional nut and washer, they are subject in turn to other disadvantages. They include relatively delicate mechanisms requiring complex movements and are not well suited to the types of forces and environments encountered by automotive vehicles. In addition, they require special manipulation of an installation tool or wrench over and above the normal use of a wrench with a nut.

Another prior approach has been to use a nut and a non-rotating retainer normally separated by a spring and having interfacing teeth or similar locking structures. As the assembly is tightened, the spring force is overcome and the nut becomes locked to the retainer to prevent further rotation. In addition to complexity and expense, the arrangement has the disadvantage that as the nut reaches its final position, it is not free spinning. The ragged, uneven torque characteristic interferes with the use of torque detecting equipment that could otherwise detect a predetermined degree of tightening of the fastener assembly. Also, this assembly requires at least the amount of preload necessary to compress the spring normally separating the nut from the retainer.

SUMMARY OF THE INVENTION

It is a primary object of the present invention to provide an improved locking fastener assembly that is free spinning during installation and removal yet is positively locked after installation simply by the normal engagement and removal of a standard installation tool or wrench. Other objects are to provide locking fastener assemblies that are simple and rugged and inexpensive; and to provide locking fastener assemblies that are very easy to use and that cannot be assembled or installed improperly. Another object is to provide improvements in axle bearing fastener assemblies and to overcome difficulties encountered with axle bearing nut installations known in the past.

In brief, in accordance with the above and other objects of the present invention there is provided a threaded joint of the type tightened and loosened with a tool and including a relatively fixed structure incorporating a threaded member and a first restraining means. A relatively movable locking fastener assembly is engageable with the relatively fixed structure and includes a rotatable fastener and a retainer. The fastener has a tool receiving portion and a thread structure engageable with the threaded member for tightening or loosening of the joint in response to rotation of the fastener. The retainer includes second restraining means engageable with the first restraining means for preventing rotation of the retainer on the threaded member. Latch means connected between the fastener and the retainer permits relative rotation between the fastener and retainer in a released position and prevents relative rotation in a latched position. The latch means includes latch release means disposed at the tool receiving portion of the fastener so that the latch is released when the fastener is engaged by a tool.

DESCRIPTION OF THE VIEWS OF THE DRAWING

The present invention together with the above and other objects and advantages may be best understood from the following detailed description of the preferred embodiment of the invention illustrated in the accompanying drawings wherein:

FIG. 1 is a simplified, somewhat diagrammatic, fragmentary side elevational view of an axle assembly provided with a locking fastener assembly embodying the present invention;

FIG. 2 is an enlarged end view taken from the line 2—2 of FIG. 1;

FIG. 3 is a partial sectional view taken along the line 3—3 of FIG. 2;

FIG. 4 is an enlarged sectional view taken along the line 4—4 of FIG. 2;

FIG. 5 is a fragmentary sectional view taken along the line 5—5 of FIG. 3;

FIG. 6 is a view like FIG. 5 showing the released condition of the fastener assembly;

FIG. 7 is a view like part of FIG. 4 showing the released condition of the fastener assembly; and FIG. 8 is a perspective view showing the components of the locking fastener assembly prior to assembly.

DETAILED DESCRIPTION

Having reference now to the drawings and initially to FIG. 1, there are illustrated in somewhat simplified and diagrammatic fashion certain components of a threaded joint designated as a whole by the reference character 10. The threaded joint includes a locking fastener assembly generally designated as 12 and constructed in accordance with the principles of the present invention.

In the preferred embodiment of the invention illustrated in the drawings, the threaded joint 10 is typical of an axle bearing assembly for an automotive vehicle such as a truck, automobile or the like. However, the principles of the present invention are applicable to locking fastener assemblies for a wide variety of threaded joints including axle assemblies of different configurations as well as others.

Axle assembly 10 includes a spindle 14 provided with a suitable flange 16 for supporting the spindle suspended from the frame of an automotive vehicle. A wheel hub 18 supports studs 20 for mounting a wheel on the hub. A caliper brake disc 22 is carried by the hub, although a drum brake might be employed instead. The wheel hub 18 is mounted for rotation around the spindle 14 by an inner bearing assembly 24 and an outer bearing assembly 26 held in position by the locking fastener assembly 12 of the present invention.

While FIG. 1 illustrates in simplified fashion one type of axle assembly, many different types are also used. In some arrangements, inner and outer bearing assemblies may be interposed between a driven spindle or axle upon which a wheel is mounted and a support suspended from a vehicle frame. In other arrangements, for example as employed on four-wheel drive vehicles, the spindle may be a tube interposed between a drive axle and a wheel hub. The locking fastener assembly 12 of the present invention may be employed in any of the various types of axle assemblies for fastening the components of the assembly together and avoiding excessive loading or end play of the bearings.

Inner bearing assembly 24 is captured between a shoulder 28 on the spindle 14 and a shoulder 30 on the wheel hub 18. Outer bearing assembly 26 is captured between a shoulder 32 on the wheel hub 18 and the locking fastener assembly 12. In different types of assemblies, spacers or the like may also be used to assist in positioning the bearing assemblies.

Assembly 12 is threaded onto a threaded portion 34 of the spindle 14 to take up any looseness or play and hold the components in place. If fastener assembly 12 is threaded too far onto the threaded portion 34, the bearing assemblies 24 and 26 are excessively loaded or compressed and their operating life is reduced. If fastener assembly 12 is not threaded far enough onto the threaded portion 34, the bearings have excessive free play and their operating life is also decreased. Thus, it is important that the fastener assembly 12 is threaded onto the portion 34 to a carefully determined position and that thereafter the fastener assembly 12 is prevented from rotating.

Having reference now more specifically to FIGS. 2-8, the locking fastener assembly 12 of the present invention includes a nut 40 associated with a retainer washer 42 and a locking clip 44. The washer is permitted to move axially upon but cannot rotate relative to the threaded portion 34 of the spindle 14. The clip 44 permits the nut 40 to rotate freely relative to washer 42 when a tool is used to thread the nut 40 onto or off of the threaded portion 34 of the spindle. When the tool is removed, the locking clip 44 achieves a positive locking action by preventing the nut 40 from rotating relative to the washer 42.

Nut 40 includes a female thread structure 46 sized to mate with the male threads formed on the threaded portion 34 of the spindle 14. The load bearing end of the nut 40 is provided with a flange 48 of increased diameter. The remainder of the nut body is provided with a tool receiving wrenching structure 50 preferably of hexagonal shape to mate with a standard wrench socket.

At one point along the periphery of the nut 40, there is provided an axially extending groove 52 recessed into the flange 48 and into the wrenching structure 50. At the flange end of the nut 40, the groove 50 intersects a radially extending groove 54 formed in the end of the nut.

Washer 42 is preferably stamped and formed from flat metal stock and includes a central axial opening 56 slightly larger in diameter than the female thread structure 46 of nut 40. A restraining tab 58 extends radially inward into the central opening 56 of the washer 42. The threaded portion 34 of spindle 14 includes a cooperating axially extending slot 60 (FIGS. 4-6) serving to receive tab 56 and prevent rotation of washer 42 around the threaded portion 34. In threaded joints of other configurations, different restraining structures might be provided for preventing rotation of a retainer.

The outer circumference of retainer washer 42 is provided with numerous fingers 62 separated by spaces or slots 64. In order to hold the washer 42 in assembly with nut 40, the washer is received against the flange end of the nut 40 and the fingers 62 are first formed axially (FIG. 8) and then formed radially inward around the outer circumference of the flange 48. In the assembled condition, clearance is provided to permit the nut 40 and the washer 42 to rotate relative to one another.

Locking clip 44 is a unitary, one-piece stamped and formed element fabricated of spring steel or similar resilient and flexible material. It includes a base portion 66 joined to a foot portion 68 received respectively in the grooves 52 and 54 of the nut 40 (FIG. 4). The end of base portion 66 opposite foot portion 68 is bounded by a loop or hinge segment 70 leading to an elongated latch release segment 72 disposed at an acute angle relative to the base portion 66. The opposite end of segment 72 defines a pair of stop shoulders 74. A locking finger 76 extends outwardly between the stop shoulders 74.

Locking clip 44 may be installed in the locking fastener assembly 12 after mounting of the retainer washer 42 on the nut 40. Segment 72 can be flexed toward the base portion 66 and the clip 44 can then be moved to the installed position best seen in FIG. 4. When the segment 72 is released, the base portion 66 is seated in the bottom of the axial groove 52 and the clip is captured against axial movement by engagement of the foot 68 in the groove 54 and engagement of the loop 70 with the nonflanged end of the nut 40. The components of the completed assembly 12 are not easily disassembled because the washer 42 is captured on the flange 48 of nut 40 and because the locking clip 44 cannot be removed from grooves 52 and 54 without great difficulty. As a result, improper use of only portions of the assembly 12 and improper installation of the assembly are prevented.

In the normal condition of the fastener assembly 12 shown in FIGS. 4 and 5, the locking finger 76 is resiliently urged in the radially outward direction. Finger 74 is sized to fit in any of the spaces 64 between fingers 62 with the stop surfaces 74 in engagement with the fingers 62 on opposite sides of the space 64. In this position, the locking clip 44 positively prevents rotation of the nut 40 relative to the retainer washer 42. When the latch release segment 72 is moved radially inwardly as seen in FIGS. 6 and 7, the locking finger 76 moves inwardly clear of the fingers 62. In this released condition, nut 40 can rotate or spin freely relative to the retainer washer 42.

In accordance with an important feature of the invention, when a wrench socket 78 (see FIGS. 6 and 7) is engaged with the wrenching structure 50 of the nut 40, the socket 78 engages the latch release segment 72 of the locking clip 44 and moves it to the released position. No special manipulation of the socket 78 is required since the normal engagement of the socket itself frees the locking clip 44. Conversely, when a wrench is not present on the wrenching structure 50, the locking finger 76 is resiliently biased radially outwardly to be received in a space 64 between adjacent fingers 62. Since the locking clip 44 is located at a corner of the hex shaped wrenching structure 50, release of the latch is assured regardless of whether a six point or a twelve point socket is used.

In use of the locking fastener assembly 12 in the threaded joint 10, the threaded portion 34 of the spindle together with the slot 34 may be considered to be a relatively fixed structure, while the fastener assembly 12 may be considered as moving relative thereto. To install the fastener, the wrench socket 78 is engaged with the hex shaped wrenching structure 50 of the nut 40 in the normal manner. As the socket is placed on the nut 40, it contacts the latch release segment 72 of the locking clip 44 and forces the segment 72 as well as the locking finger 76 radially inwardly. This action is enhanced by the angular orientation of the segment 72 providing the mechanical advantage of a cam action. When the wrench is engaged sufficiently to drive the fastener assembly 12, the locking finger 76 is completely clear of fingers 60 to achieve a free spinning action of the nut 40 relative to the retainer washer 42.

At this point, the locking fastener assembly 12 may be installed on the threaded portion 34 of the spindle 14. The tab 58 of the washer 42 is received in the slot 60 in the threaded portion 34. The nut 40 is rotated by the wrench socket 78 and is threaded onto the threaded portion 34. Threading of the nut continues until a predetermined position is reached in which the inner and outer bearing assemblies 24 and 26 are neither too tight nor too loose. This point may be determined by detecting an increase in the torque required to rotate the nut 40. An accurate determination is enabled because the nut turns freely without a prevailing torque or an uneven torque characteristic until the wrench socket 78 is removed.

At the properly installed position of the fastener assembly 12, the wrench socket 78 is removed. This frees the latch release segment 72 together with the locking finger 76 for radially outward movement. Depending upon the relative circumferential positions of fingers 62 and clip 44, the locking finger 76 may immediately enter a space 64 between two adjacent fingers 62. In this case, the nut 40 is interlocked to the retainer washer 42 and positively locked from further rotation since the retainer washer 42 is rotationally locked by tab 58 to the threaded portion 34.

Alternatively, in a slightly different position of the clip 44 relative to fingers 62, the locking finger 76 may strike a finger 62 rather than a space 64 when the wrench socket 78 is removed. Nevertheless, positive locking is assured because if nut 40 rotates a maximum of only a few degrees, the locking finger 76 becomes aligned with a space 64 and moves outwardly to a locked position.

While the invention has been described with reference to details of the preferred embodiment, these details are not intended to limit the scope of the invention as defined in the following claims.

What is claimed and desired to be secured by Letters Patent of the United States is:

1. A threaded joint of the type tightened or loosened with a tool and comprising in combination:
   a relatively fixed structure including a threaded member extending along an axis and including first restraining means;
   a relatively movable locking fastener assembly engageable with said relatively fixed structure and including a rotatable fastener and a retainer;
   said fastener having a tool receiving portion, a flange, and a thread structure engageable with said threaded member for tightening or loosening of the joint in response to rotation of the fastener around the axis;
   said retainer including means for holding said retainer in assembly with said flange, and including second restraining means engageable with said first restraining means for preventing rotation of said retainer relative to said threaded member; and
   latch means connected between said fastener and said retainer for permitting relative rotation between said fastener and retainer in released position and preventing relative rotation between said first and retainer in a latched position;
   said latch means including latch release means disposed at said tool receiving portion of said fastener for releasing said latch means in response to engagement of said fastener by said tool.

2. A threaded joint as claimed in claim 1 wherein said first and second restraining means permit axial relative movement between said retainer and said threaded member.

3. A threaded joint as claimed in claim 1 wherein said retainer is a washer.

4. A threaded joint as claimed in claim 3 wherein said washer is captured on said fastener adjacent said flange.

5. A threaded joint as claimed in claim 1 wherein said threaded member includes male threads and said fastener is a nut.

6. A threaded joint as claimed in claim 5, said retainer comprising a washer, said first restraining means comprising an axially extending slot in said male threads and said second restraining means comprising a tab portion of said washer.

7. A threaded joint as claimed in claim 6, said holding means comprising radially outwardly extending fingers formed around said flange for holding said washer in assembly with said nut.

8. A threaded joint as claimed in claim 7, said fingers being separated by spaces, said latch means including a lock means receivable in said spaces.

9. A threaded joint as claimed in claim 8, said latch means comprising a flexible and resilient clip having a base carried by said nut, an intermediate segment comprising said latch release means, and a radially extending finger segment adjacent said flange comprising said lock means.

10. A locking fastener assembly comprising:
a nut body including a female threaded axial opening, a wrenching structure and a flange end;
a washer engageable with said flange end of said nut body;
said washer including a central opening aligned with said axial opening and further including a tab extending radially into said central opening;
a plurality of fingers at the outer periphery of said washer separated by spaces between said fingers, said fingers extending around said flange end of said nut body to capture said washer for relative rotation on said nut body; and
a flexible and resilient locking clip having a base portion mounted on said nut body, a finger portion normally received in one of said spaces between said fingers to prevent rotation of said washer relative to said nut body, and an intermediate segment adjacent said wrenching structure in the path of engagement of a tool with said wrenching structure.

11. The locking fastener assembly defined in claim 10, further comprising an axially extending groove in said wrenching structure of said nut, said intermediate segment of said clip being received in said groove upon resilient deformation of said clip.

12. The locking fastener assembly defined in claim 11 wherein said wrenching structure is hex-shaped or double hex-shaped and said groove is located at a corner of the wrenching structure.

13. In a vehicle axle assembly tightened or loosened with a tool and having a threaded axle member extending along an axis, axle bearing means and a guide means extending in the axial direction;
a locking fastener assembly comprising in combination;
a rotatable nut having a tool receiving portion, and a threaded structure engageable with said threaded axle member for tightening or loosening of the axle assembly in response to rotation of the nut around the axis;
a retainer including follower means engageable with said guide means for permitting axial movement while preventing rotation of said follower means relative to the threaded axle member; and
radially movable latch means connected between said nut and said retainer in a released position and preventing relative rotation between said nut and retainer in a latched position;
said fastener assembly being characterized by said latch means including a portion disposed at said tool receiving portion of said nut for releasing said latch means at initial engagement by said tool.

14. The vehicle axle assembly of claim 1 wherein said retainer is a washer, said guide means is an axial slot in the threaded axle member and said follower means is an inwardly extending tab portion of said washer.

* * * * *